(12) United States Patent
Jung et al.

(10) Patent No.: US 11,126,031 B2
(45) Date of Patent: Sep. 21, 2021

(54) POLARIZING PLATE AND LIQUID CRYSTAL DISPLAY DEVICE INCLUDING SAME

(71) Applicant: Samsung SDI Co., Ltd., Yongin-si (KR)

(72) Inventors: Yong Un Jung, Suwon-si (KR); Young Oh, Suwon-si (KR); Dong Ho Wee, Suwon-si (KR); Young Hyun Ju, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 120 days.

(21) Appl. No.: 16/612,703

(22) PCT Filed: May 14, 2018

(86) PCT No.: PCT/KR2018/005500
§ 371 (c)(1),
(2) Date: Nov. 11, 2019

(87) PCT Pub. No.: WO2018/221872
PCT Pub. Date: Dec. 6, 2018

(65) Prior Publication Data
US 2020/0209680 A1    Jul. 2, 2020

(30) Foreign Application Priority Data
Jun. 1, 2017   (KR) .................. 10-2017-0068668

(51) Int. Cl.
*G02F 1/1335*    (2006.01)
*B32B 7/023*     (2019.01)
(Continued)

(52) U.S. Cl.
CPC ........ *G02F 1/133528* (2013.01); *B32B 7/023* (2019.01); *B32B 7/12* (2013.01);
(Continued)

(58) Field of Classification Search
CPC . G02F 1/133528; G02F 5/3041; B32B 7/023; B32B 7/12; B32B 27/08; B32B 27/18; B32B 5/30
See application file for complete search history.

(56) References Cited

U.S. PATENT DOCUMENTS

2010/0110362 A1    5/2010 Parri et al.
2010/0171908 A1*   7/2010 Yoshihara ............... G02B 1/111
                                                           349/96
2016/0252665 A1*   9/2016 Lee ....................... G02B 5/305
                                                           359/489.07

FOREIGN PATENT DOCUMENTS

CN    101900841 A    12/2010
CN    102067019 A    5/2011
(Continued)

OTHER PUBLICATIONS

China Office Action from corresponding Chinese Patent Application No. 201880036418.4, Chinese Office Action dated Apr. 1, 2021 (9 pgs.).

*Primary Examiner* — Michael C Miggins
(74) *Attorney, Agent, or Firm* — Lewis Roca Rothgerber Christie LLP

(57) ABSTRACT

Provided are a polarizing plate and a liquid crystal display device including same, the polarizing plate including a polarization film, a contrast-improving layer, and an anti-reflection film that are sequentially laminated. The minimum reflectance of the anti-reflection film is no greater than 0.45%. The anti-reflection film has a first substrate layer, a high-refraction layer and a low-refraction layer that are laminated in order from the contrast-improving layer. The contrast-improving layer includes a first resin layer and a second resin layer facing the first resin layer. The second resin layer is provided with a pattern part having optical patterns and a flat part between the optical patterns. The
(Continued)

pattern part satisfies Equation 1 and the optical patterns have a base angle (θ) of 75° to 90°. The slope of the reflectance of the polarization plate in Equation 2 is no greater than 0.3.

21 Claims, 4 Drawing Sheets

(51) Int. Cl.
  *B32B 7/12* (2006.01)
  *B32B 27/08* (2006.01)
  *B32B 27/18* (2006.01)
  *G02B 5/30* (2006.01)

(52) U.S. Cl.
  CPC .............. *B32B 27/08* (2013.01); *B32B 27/18* (2013.01); *G02B 5/3041* (2013.01)

(56) References Cited

FOREIGN PATENT DOCUMENTS

| CN | 103154776 A | 6/2013 |
| JP | 2001-253960 A | 9/2001 |
| JP | 2006-251659 A | 9/2006 |
| KR | 10-2010-0127954 A | 12/2010 |
| KR | 10-2016-0105276 A | 9/2016 |
| KR | 10-1659241 B1 | 9/2016 |
| KR | 10-2017-0057087 A | 5/2017 |
| WO | WO 2016/175580 A1 | 11/2016 |

* cited by examiner

[FIG. 1]
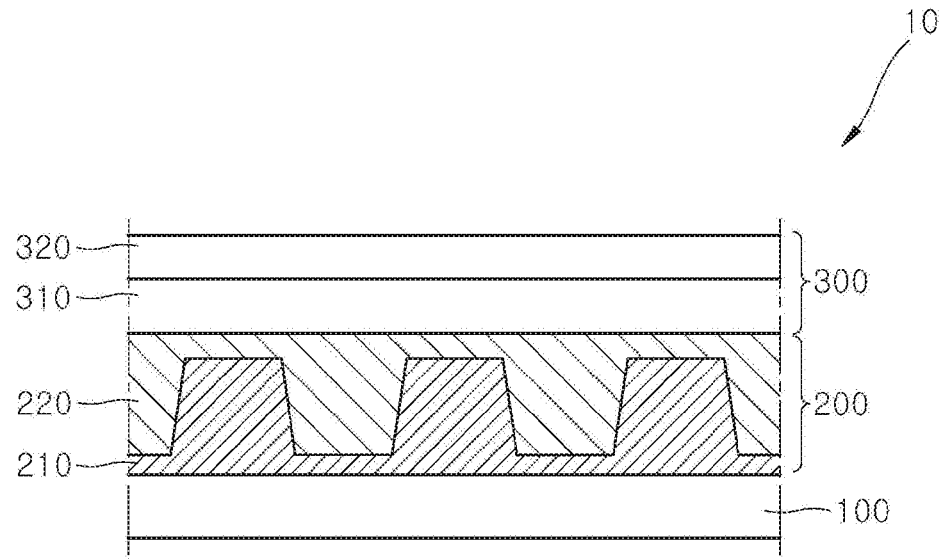
[FIG. 2]
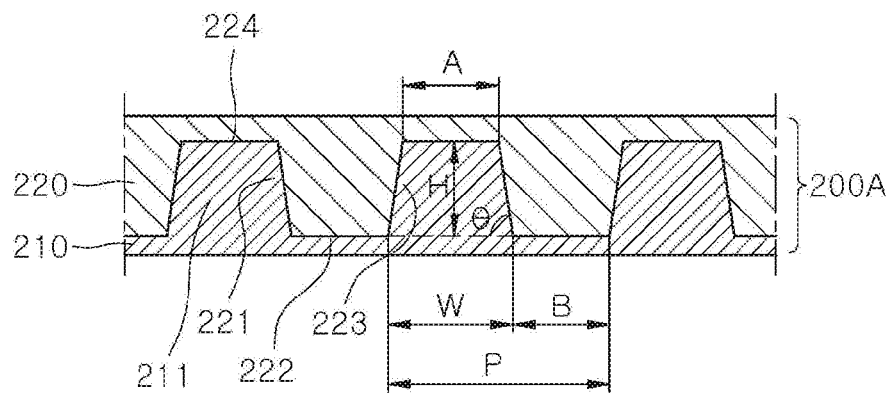
[FIG. 3]
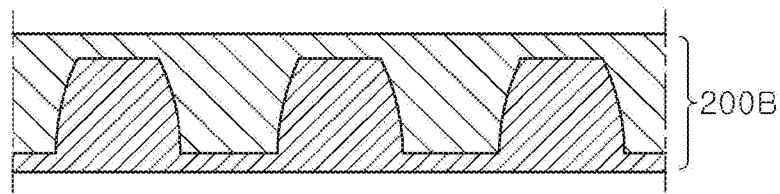

【FIG. 4】
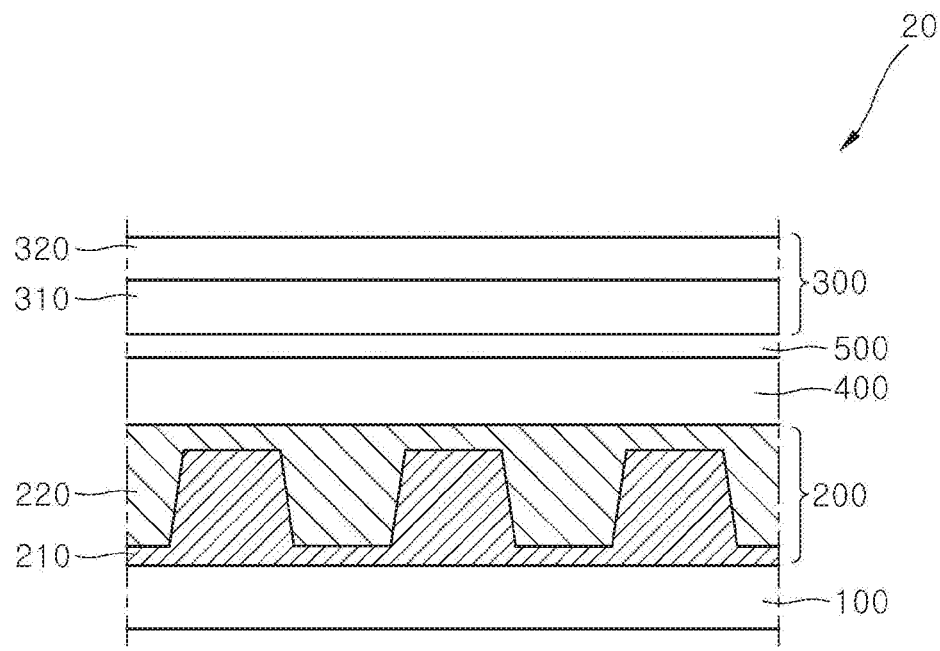
【FIG. 5】
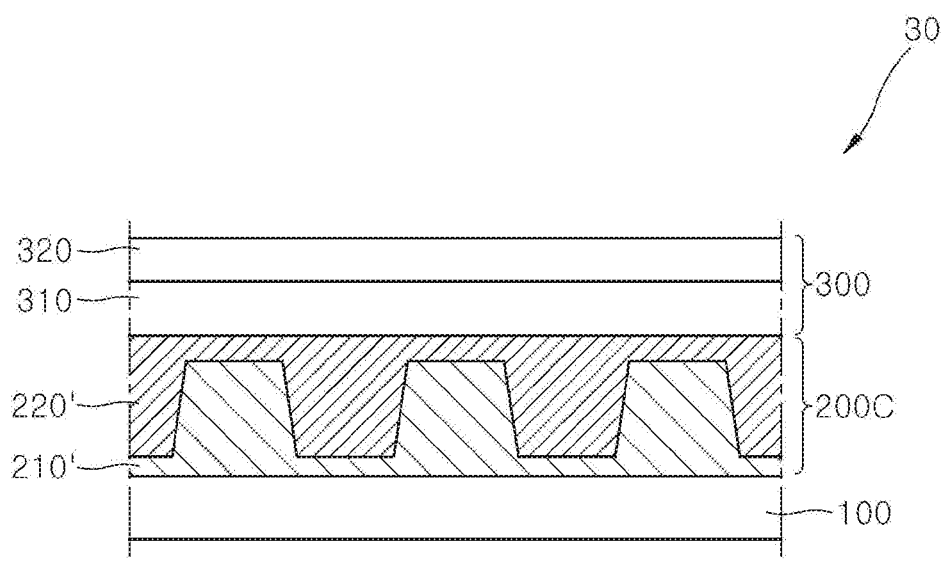

[FIG. 6]
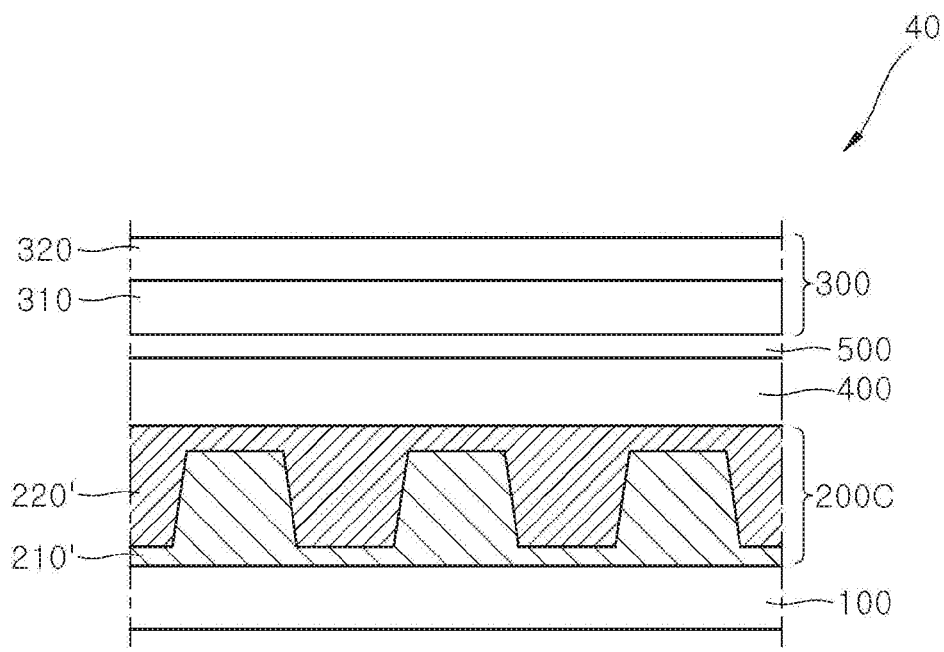
[FIG. 7]
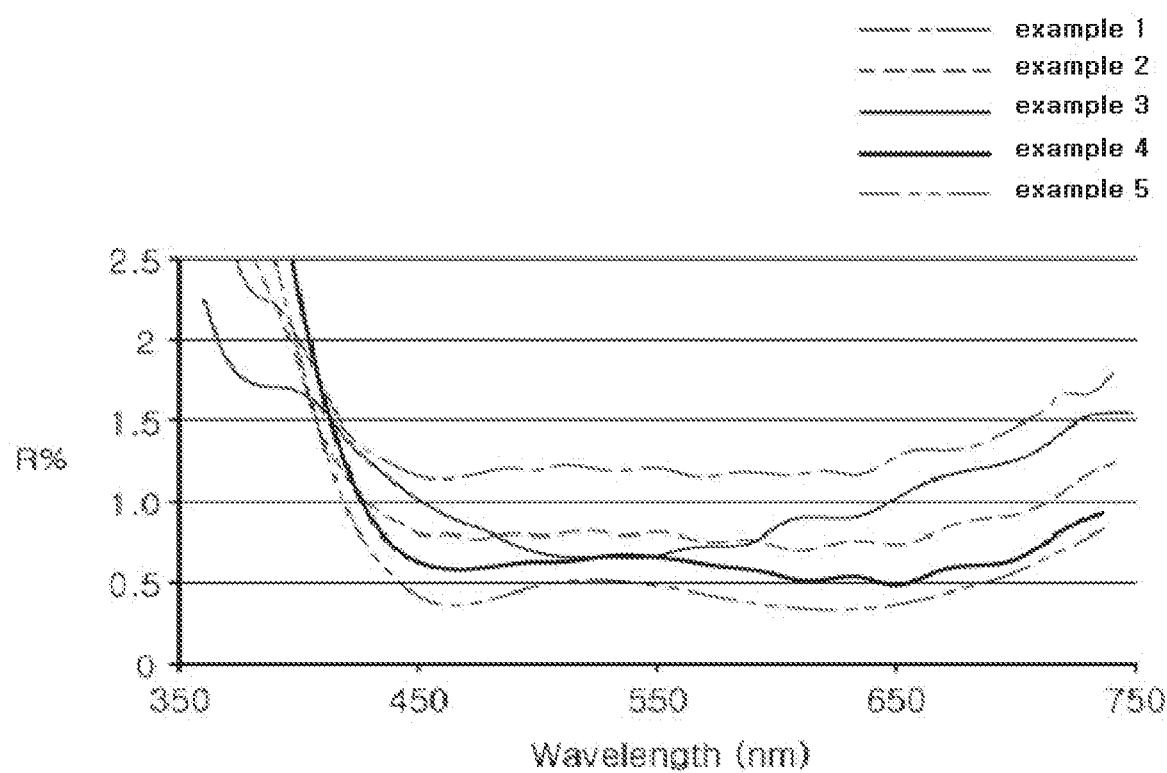

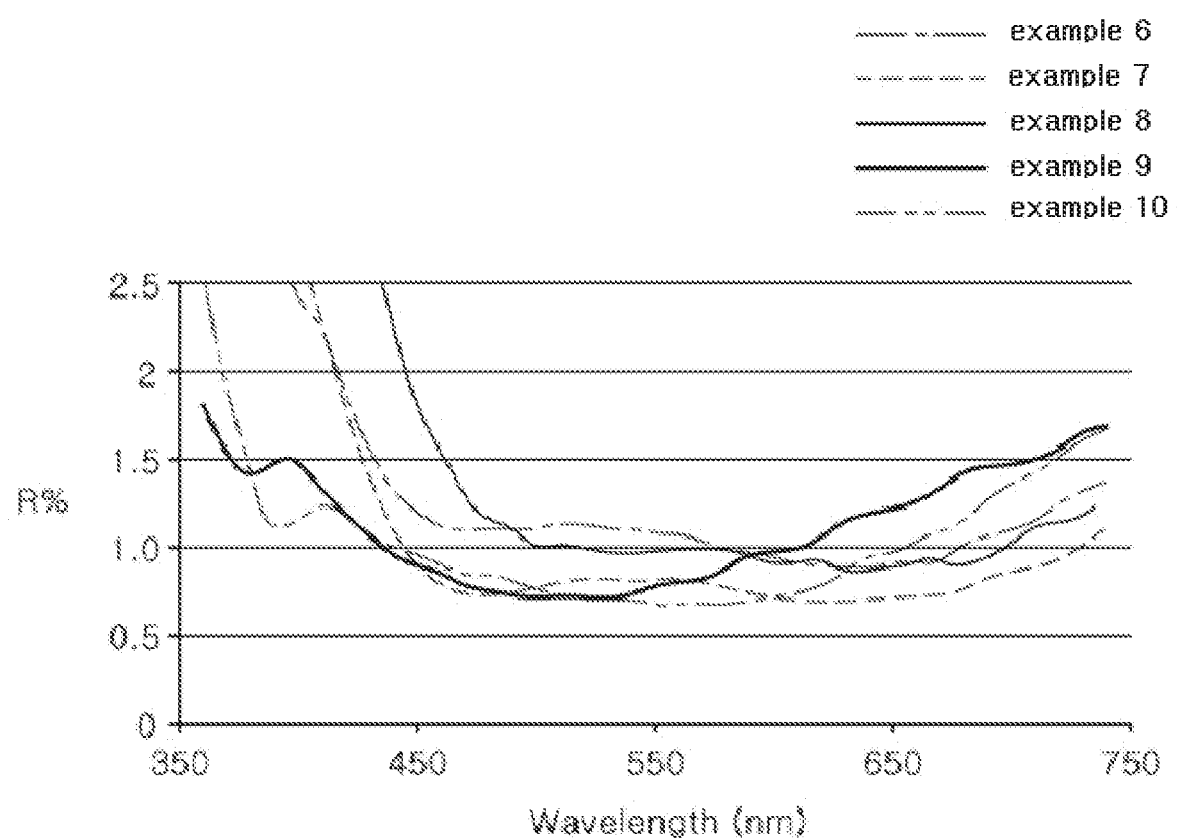
[FIG. 8]

POLARIZING PLATE AND LIQUID CRYSTAL DISPLAY DEVICE INCLUDING SAME

CROSS-REFERENCE TO RELATED APPLICATIONS

This application is a U.S. National Phase Patent Application of International Application Number PCT/KR2018/005500, filed on May 14, 2018, which claims priority to Korean Patent Application Number 10-2017-0068668, filed on Jun. 1, 2017, the entire contents of both of which are incorporated herein by reference.

TECHNICAL FIELD

The invention relates to a polarizing plate and a liquid crystal display device including the same.

BACKGROUND ART

A liquid crystal display device is operated by emitting light from a backlight unit through a liquid crystal panel. Therefore, a front contrast ratio (CR) is relatively good in the liquid crystal display device. However, a side contrast ratio of the liquid crystal display device is relatively low. Therefore, it is necessary to minimize reduction of the front contrast ratio when the side contrast ratio is increased to improve visibility.

Meanwhile, the liquid crystal display device may not be continuously driven but may be in a non-driven state. When the liquid crystal display device is in the non-driven state, external light such as sunlight or lighting may be irradiated on a screen of the liquid crystal display device. In this case, the screen may have unevenness or mura, or reflected light may be split, so that black visual sensitivity and appearance of the liquid crystal display device may be deteriorated.

Therefore, a polarizing plate is required which has an improved front contrast ratio as well as an improved side contrast ratio in the driven state and does not cause the above-mentioned degradation of black visual sensitivity and appearance in the non-driven state.

A background art is disclosed in Japanese Laid-Open Patent Publication No. 2006-251659.

DISCLOSURE

Technical Problem

It is an object of the present invention to provide a polarizing plate capable of improving black visual sensitivity and appearance even when external light such as sunlight or lighting is irradiated.

It is another object of the present invention to provide a polarizing plate capable of preventing rainbow mura or unevenness even when external light such as sunlight or lighting is irradiated.

It is another object of the present invention to provide a polarizing plate capable of improving visibility, a side viewing angle and a side contrast ratio.

Technical Solution

A polarizing plate of the invention may include a polarizing film, a contrast ratio enhancing layer, and an antireflection film, which are sequentially laminated in this order, the antireflection film having a minimum reflectance of 0.45% or less, the antireflection film including a first base layer, a high refractive index layer, and a low refractive index layer, which are sequentially laminated on the contrast ratio enhancing layer in this order, the contrast ratio enhancing layer includes a first resin layer and a second resin layer facing the first resin layer, wherein the second resin layer includes a patterned portion including optical patterns and a flat portion formed between the optical patterns, the patterned portion satisfying following Equation 1, each optical pattern having a base angle $\theta$ of 75° to 90°:

$$1 < PB \leq 6 \qquad \text{[Equation 1]}$$

wherein, P is a pitch of the patterned portion (unit: μm), and

B is a maximum width of the flat portion (unit: μm), the polarizing plate having a reflectance slope of 0.3 or less according to following Equation 2:

$$\text{Reflectance slope} = |R_{600} - R_{500}| / |600 - 500| \times 100 \qquad \text{[Equation 2]}$$

wherein, $R_{600}$ is a reflectance value of a polarizing plate at a wavelength of 600 nm, and $R_{500}$ is a reflectance value of a polarizing plate at a wavelength of 500 nm.

A liquid crystal display device of the invention may include the polarizing plate of the invention.

Advantageous Effects

The invention provides a polarizing plate capable of improving black visual sensitivity and appearance even when external light such as sunlight or lighting is irradiated.

The invention provides a polarizing plate capable of preventing rainbow mura or unevenness even when external light such as sunlight or lighting is irradiated.

The invention provides a polarizing plate capable of improving visibility, a side viewing angle and a side contrast ratio.

BRIEF DESCRIPTION OF THE DRAWINGS

FIG. 1 is a cross-sectional view of a polarizing plate according to an embodiment of the invention.

FIG. 2 is a detailed cress-sectional view of a contrast ratio enhancing layer of the polarizing plate of FIG. 1.

FIG. 3 is a cross-sectional view of a contrast ratio enhancing layer of a polarizing plate according to another embodiment of the invention.

FIG. 4 is a cross-sectional view of a polarizing plate according to still another embodiment of the invention.

FIG. 5 is a cross-sectional view of a polarizing plate according to still another embodiment of the invention.

FIG. 6 is a cross-sectional view of a polarizing plate according to still another embodiment of the invention.

FIG. 7 shows reflectance of polarizing plates of Examples 1 to 5 depending on a wavelength.

FIG. 8 shows reflectance of polarizing plates of Examples 6 to 10 depending on a wavelength.

BEST MODE

Exemplary embodiments of the invention are described in detail with reference to the accompanying drawings. It is understood that the invention is not limited to the following embodiments and may be embodied in different ways. In the drawings, portions irrelevant to the description are omitted for clarity. Like components are denoted by like reference numerals throughout the specification.

As used herein, spatially relative terms such as "upper portion" and "lower portion" are defined with reference to the accompanying drawings. Thus, it is understood that the term "upper portion" can be used interchangeably with the term "lower portion". It is understood that when an element such as a layer, film, region or substrate is referred to as being placed "on" another element, it can be placed directly on the other element, or intervening layer(s) may be present. On the other hand, when an element is referred to as being placed "directly on" another element, no intervening layer is present between two elements.

As used herein, the terms "horizontal direction" and "vertical direction" refer to a longitudinal direction and a transverse direction of a screen of a liquid crystal display, respectively.

As used herein, the term "side" refers to a region in which θ ranges from 60° to 90° in a spherical coordinate system (φ, θ) in which a front is indicated by (0°, 0°), a left end point is indicated by (180°, 90°), and a right end point is indicated by (0°, 90°) with reference to the horizontal direction.

As used herein, the term "top part" refers to a portion located at an uppermost portion with respect to a lowermost portion of an engraved optical pattern.

As used herein, the term "aspect ratio" refers to a ratio of a maximum height of an optical pattern to a maximum width of the optical pattern (maximum height/maximum width).

As used herein, the term "pitch" refers to a sum of a maximum width of one optical pattern and a width of one flat portion adjacent to the optical pattern.

As used herein, the term "in-plane retardation Re" is a value at a wavelength of 550 nm and is represented by following Equation A:

$$Re=(nx-ny) \times d \qquad [\text{Equation A}]$$

wherein, nx and ny are refractive indices at a wavelength of 550 nm in a slow axis direction and a fast axis direction respectively in a corresponding protective layer or base layer, and d is a thickness of a corresponding protective layer or base layer (unit: nm).

As used herein, the term "minimum reflectance" of an antireflection film refers to lowest reflectance measured in a wavelength range of 360 nm to 740 nm in SCI reflection mode (light source: D65, light source aperture: φ 25.4 mm, measurement viewing angle: 2°) with a spectrophotometer (Konica Minolta Co., Ltd., CM-3600A) for a specimen prepared by laminating a black acrylic sheet (Nitto Jushi Kogyo Co., Ltd., CLAREX) on a first base layer of an antireflection film.

As used herein, the term "luminous reflectance" of a polarizing plate refers to Y value (D65) measured in a wavelength range of 360 nm to 740 nm in SCI reflection mode (light source: D65, light source aperture: φ 25.4 mm, measurement viewing angle: 2°) with a spectrophotometer (Konica Minolta Co., Ltd., CM-3600A) for a specimen prepared by laminating a black acrylic sheet (Nitto Jushi Kogyo Co., Ltd., CLAREX) on a lower portion of a polarizing film of a polarizer. Y (D65) is a Y value measured with a D65 light source, and Y (D65) may be an integral value of reflectance at each wavelength×intensity of a light source at each wavelength×Y (green color stimulus value) color function in a visible light region wavelength.

As used herein, the term "reflectance slope" of a polarizing plate refers to a slope of reflectance at a wavelength of 500 nm and reflectance at a wavelength of 600 nm measured in a wavelength range of 360 nm to 740 nm in SCI reflection mode (light source: D65, light source diameter: φ 25.4 mm, measurement viewing angle: 2°) with a spectrophotometer (Konica Minolta Co., Ltd., CM-3600A) for a specimen prepared by laminating a black acrylic sheet (Nitto Jushi Kogyo Co., Ltd., CLAREX) on a lower portion of a polarizing film of a polarizing plate, and the reflectance slope value is calculated according to Equation 2 below:

$$\text{Reflectance slope} = |R_{600} - R_{500}| / |600 - 500| \times 100 \qquad [\text{Equation 2}]$$

wherein, $R_{600}$ is a reflectance value of a polarizing plate at a wavelength of 600 nm, and $R_{500}$ is a reflectance value of a polarizing plate at a wavelength of 500 nm.

The term "reflectance value" means a percentage % value of reflectance.

As used herein, "(meth)acryl" means acryl and/or methacryl.

Hereinafter, a polarizing plate according to an embodiment of the invention will be described with reference to FIGS. 1 and 2. FIG. 1 is a cross-sectional view of a polarizing plate according to an embodiment of the invention. FIG. 2 is a detailed cross-sectional view of a contrast ratio enhancing layer of the polarizing plate of FIG. 1.

Referring to FIG. 1, a polarizing plate 10 may include a polarizing film 100, a contrast ratio enhancing layer 200, and an antireflection film 300.

The polarizing plate 10 is used as a viewer side polarizing plate in a liquid crystal display. Therefore, the polarizing plate 10 may be influenced by external light such as sunlight or lighting when the liquid crystal display device is not driven. The polarizing plate 10 may include a polarizing film 100, a contrast ratio enhancing layer 200, and an antireflection film 300, which are sequentially laminated in this order. The antireflection film 300 may have minimum reflectance of 0.45% or less. The contrast ratio enhancing layer 200 may include a first resin layer and a second resin layer described below. Accordingly, when external light is incident on the polarizing plate 10 while the liquid crystal display device is not driven, the polarizing plate 10 may prevent scattering or color dispersion of external light by optical patterns in the first resin layer and the second resin layer. Thus, it is possible to improve appearance and black visual sensitivity during the non-driven state of the liquid crystal display device by preventing mura, unevenness or splitting of a screen.

The polarizing plate may have a reflectance slope of 0.3 or less, for example 0.01 to 0.3. Within this range, even when external light is irradiated on the polarizing plate while the liquid crystal display device is not driven, color dispersion of the external light by the optical pattern in the first resin layer or the second resin layer may be reduced to improve appearance and black visual sensitivity of the liquid crystal display device. The reflectance slope is used for evaluating whether an observer can visually recognize mura or spots when the observer views the screen while the liquid crystal display device is not driven at a wavelength of 500 nm to 600 nm which includes 550 nm, a representative wavelength of a visible light region. When the reflectance slope is 0.3 or less, black visual sensitivity is good, and visibility may be improved at the time of driving. The above-described range of reflectance slope may be realized by the polarizing plate of the invention.

In one embodiment, the polarizing plate may have luminous reflectance of 2% or less, for example 0% to 2%, 0% to 1.5%. Within this range, even when external light is irradiated on the polarizing plate while the liquid crystal display device is not driven, color dispersion of the external light by the optical pattern in the first resin layer or the second resin layer may be reduced to improve appearance and black visual sensitivity of the liquid crystal display device. The luminous reflectance is used for evaluating non-existence of mura or spots and black visual sensitivity at the time of non-driving of the liquid crystal display device. The lower the luminous reflectance is, the better the black visual sensitivity is without showing mura or spots at the time of non-driving of the liquid crystal display device. The above-described range of luminous reflectance may be realized by the polarizing plate of the invention.

In addition, in the polarizing plate 10, the polarizing film 100 and the contrast ratio enhancing layer 200 are sequentially laminated. Thus, visibility may be improved at the time of driving of the liquid crystal display device to improve a side contrast ratio and a side viewing angle. In particular, the antireflection film 300 formed on the contrast ratio enhancing layer 200 may perform the above-described non-driving function without affecting visibility or a side contrast ratio when the liquid crystal display device is driven.

Particularly, in the polarizing plate 10, the polarizing film 100, the contrast ratio enhancing layer 200, and the antireflection film 300 are laminated, and it is possible to prevent appearance damage due to external light while the liquid crystal display device is not driven, and visibility may be improved by the contrast ratio enhancing layer 200 while the liquid crystal display device is driven. Thus, the above-described improved effects may be obtained both in driving and non-driving states.

Polarizing Film

The polarizing film 100 may polarize and transmit light incident from a liquid crystal panel.

The polarizing film 100 may include a polarizer. Specifically, the polarizer may include a polyvinyl alcohol-based polarizer produced by uniaxially stretching a polyvinyl alcohol-based film, or a polyene-based polarizer produced by dehydrating a polyvinyl alcohol-based film. The polarizer may have a thickness of 5 µm to 40 µm. Within this range, the polarizer may be used in an optical display device.

The polarizing film 100 may include a polarizer and a protective layer formed on at least one surface of the polarizer. The protective layer may protect the polarizer to enhance reliability and mechanical strength of the polarizing plate.

The protective layer may include at least one of an optically transparent protective film and protective coating layer.

When the protective layer is a protective film type, the protective layer may include a protective film formed of an optically transparent resin. The protective film may be formed by melting and extruding the resin. If necessary, a stretching process may be added. The resin may be selected from a group consisting of a cellulose ester-based resin including triacetyl cellulose (TAC) and the like, a cyclic polyolefin-based resin including an amorphous cyclic olefin polymer (COP), a polycarbonate-based resin, a polyester-based resin including polyethylene terephthalate (PET) and the like, a polyether sulfone-based resin, a polysulfone-based resin, a polyamide-based resin, a polyimide-based resin, a non-cyclic polyolefin-based resin, a polyacrylate-based resin including a polymethylmethacrylate resin, a polyvinyl alcohol-based resin, a polyvinyl chloride-based resin, a polyvinylidene chloride-based resin, and an acryl-based resin.

When the protective layer is a protective coating layer type, adhesion to a polarizer, transparency, mechanical strength, thermal stability, moisture barrier property, and durability may be improved. In one embodiment, the protective coating layer may be formed of an active energy ray-curable resin composition including an active energy ray-curable compound and a polymerization initiator.

The active energy ray-curable compound may include at least one of a cationic polymerizable curable compound, a radically polymerizable curable compound, a urethane resin, and a silicone resin. The cationic polymerizable curable compound may be an epoxy-based compound having at least one epoxy group in the molecule, or an oxetane-based compound having at least one oxetane ring in the molecule. The radically polymerizable curable compound may be a (meth)acryl-based compound having at least one (meth)acryloyloxy group in the molecule.

The epoxy-based compound may be at least one of a hydrogenated epoxy compound, a chained aliphatic epoxy compound, a cyclic aliphatic epoxy compound, and an aromatic epoxy compound.

The radically polymerizable curable compound may provide a protective coating layer having excellent hardness, mechanical strength and durability. The radically polymerizable curable compound may be obtained by reacting two or more kinds of a (meth)acrylate monomer having at least one (meth)acryloyloxy group in the molecule and a compound having the functional group, and a (meth)acrylate oligomer having at least two (meth)acryloyloxy groups may be mentioned as an example. Examples of the (meth)acrylate monomer may include a monofunctional (meth)acrylate monomer having one (meth)acryloyloxy group in the molecule, a difunctional (meth)acrylate monomer having two (meth)acryloyloxy groups in the molecule, and a multifunctional (meth)acrylate monomer having three or more (meth)acryloyloxy groups in the molecule. Examples of the (meth)acrylate oligomer may include a urethane (meth)acrylate oligomer, a polyester (meth)acrylate oligomer, an epoxy (meth)acrylate oligomer, and the like.

The polymerization initiator may cure the active energy ray-curable compound. The polymerization initiator may include at least one of a photo cationic initiator and a photosensitizer. A photo cationic initiator known to those skilled in the art may be used. Specifically, an onium salt including a cation and an anion may be used as the photo cationic initiator. Specifically, examples of the cation may include diphenyl iodonium, 4-methoxydiphenyl iodonium, bis(4-methylphenyl) iodonium, bis(4-tert-butylphenyl) iodonium, bis(dodecylphenyl) iodonium, diaryl iodonium such as (4-methylphenyl) [(4-(2-methylpropyl)phenyl] iodonium, triphenylsulfonium, triarylsulfonium such as diphenyl-4-thiophenoxyphenylsulfonium, bis[4-(diphenylsulfonio)phenyl]sulfide and the like. Examples of the anion may include hexafluorophosphate ($PF_6^-$), tetrafluoroborate ($BF_4^-$), hexafluoroantimonate ($SbF_6^-$), hexafluoroarsenate ($AsF_6^-$), hexachloroantimonate ($SbCl_6^-$) and the like. A photosensitizer conventionally known to those skilled in the art may be used. Specifically, the photosensitizer may be at least one selected from the group consisting of thioxanthone, phosphorus, triazine, acetophenone, benzophenone, benzoin, and oxime.

The active energy ray-curable resin composition may further include a conventional additive such as a silicon leveling agent, a UV absorber, an antistatic agent, and the like.

The protective layer may have a thickness of 5 µm to 200 µm, specifically 30 µm to 120 µm. When the protective layer is a protective film type, the protective layer may have a thickness of 30 µm to 100 µm. When the protective layer is a protective coating film type, the protective layer may have a thickness of 5 µm to 50 µm. Within this range, the protective layer may be used in a display device.

A functional coating layer such as a primer layer, a hard coating layer, an anti-fingerprint layer, an antireflection layer, and the like may be further formed on at least one surface of the protective layer. The primer layer may improve adhesion between the polarizer and the protective layer. The hard coating layer, the anti-fingerprint layer, the antireflection layer, and the like may provide additional functions to the protective layer, the polarizing film, and the like.

When the protective layer is a protective coating film type, the protective layer may be formed directly on the polarizer. However, when the protective layer is a protective film type, the protective film may be formed on the polarizer by a bonding agent for a polarizing plate, such as a boding layer formed of an aqueous bonding agent, a photocurable bonding agent, or a pressure-sensitive bonding agent.

Contrast Ratio Enhancing Layer

The contrast ratio enhancing layer 200 may be formed on a light exit surface of the polarizing film 100 to diffuse polarized light transmitted from the polarizing film 100 to improve visibility.

Referring to FIGS. 1 and 2, the contrast ratio enhancing layer 200 may include a first resin layer 210 and a second resin layer 220. The first resin layer 210 and a second resin layer 220 may face each other. Referring to FIG. 1, the first resin layer 210 and the second resin layer 220 are sequentially formed on the polarizing film 100.

The second resin layer 220 may include a patterned portion including optical patterns 221 and a flat portion 222 formed between the optical patterns 221. FIG. 2 illustrate that each optical pattern 221 is an engraved pattern.

The patterned portion may satisfy following Equation 1, and each optical pattern 221 may have a base angle θ of 75° to 90°. The base angle θ may mean that an angle between an inclined surface 223 of the optical pattern 221 and a line extending along a maximum width W of the optical pattern 221 is in a range of 75° to 90°. In the measurement of the base angle θ, the inclined surface is defined as an inclined surface directly connected to the flat portion. Within this range, relative front luminance may be increased, while a front contrast ratio and a side contrast ratio being simultaneously improved. In addition, a difference between the front contrast ratio and the side contrast ratio may be reduced, and a contrast ratio under the same side viewing angle and a contrast ratio under the same front viewing angle are increased. Further, ensuring the above-mentioned reflectance slope would be more advantageous by satisfying the above Equation 1 and having a base angle θ of 75° to 90°. Specifically, the base angle θ may be in a range of 80° to 90°, 85° to 90°. PB (ratio of P to B) may be in a range of 1.5 to 3:

$$1 < PB \leq 6 \quad \text{[Equation 1]}$$

wherein, P is a pitch of the patterned portion (unit: µm), and

B is a maximum width of the flat portion (unit: µm),

FIG. 2 illustrate that both base angles of each optical pattern are the same, but optical patterns having different base angles may also be included within the scope of the invention as long as the base angle is in the above-mentioned range of 75° to 90°.

The optical pattern 221 may be an engraved optical pattern including a first surface 224 at a top part and at least one inclined surface 223 connected to the first surface 224.

The first surface 224 may be formed at a top part so that light reaching the second resin layer 220 is more diffused by the first surface 224 in an optical display device to increase a viewing angle and luminance. Therefore, the polarizing plate may increase light diffusion and minimize loss of luminance.

FIG. 2 illustrates that the first surface 224 is flat and formed to be parallel to the flat portion 222. However, the first surface 224 may have a small concavo-convex or be a curved surface. When the first surface 224 is a curved surface, a lenticular lens pattern may be formed thereon.

A width A of the first surface 224 may be 0.5 µm to 30 µm, specifically 21 µm to 20 µm. FIG. 2 shows that the engraved pattern has a trapezoidal cross-sectional shape in which one flat surface is formed at the uppermost surface thereof and an inclined surface is a flat surface (for example: a truncated prism pattern having a truncated triangular cross-section, that is, a truncated prism shape). However, as shown in FIG. 3, an engraved pattern in which a first surface is formed at the uppermost surface thereof and an inclined surface is a curved surface (for example: a contrast ratio enhancing layer 200B having a truncated lenticular lens pattern or a truncated micro-lens pattern) may also be included within the scope of the invention. In some embodiments, the engraved pattern may have a trapezoidal shape cross-section, a rectangular shape cross-section, or a square shape cross-section, which has a good reflectance slope and good visibility.

The optical pattern 221 may have an aspect ratio H/W of 0.3 to 3.0, specifically 0.4 to 2.5, more specifically 0.4 to 1.5, 0.4 to 1.0. Within this range, a side contrast ratio and a side viewing angle of an optical display device may be improved.

The optical pattern 221 may have a height H of 40 µm or less, specifically 30 µm or less, more specifically 3 µm to 15 µm. Within this range, a contrast ratio, a viewing angle, and luminance may improve without showing a Moire phenomenon. FIG. 2 illustrates that the patterned portion has the same heights in the optical patterns. However, the heights of the optical patterns may be different from each other, or at least one height of neighboring optical patterns may be different from each other.

The optical pattern 221 may have a maximum width W of 50 µm or less, specifically 20 µm or less, more specifically 3 µm to 20 µm, 5 µm to 30 µm. Within this range, a contrast ratio, a viewing angle, and luminance may improve without showing a Moire phenomenon. FIG. 2 illustrates that the patterned portion has the same maximum widths in the optical patterns. However, the maximum widths of the optical patterns may be different from each other, or at least one width of neighboring optical patterns may be different from each other.

The flat portion 222 may exit light which arrives at the flat portion and may diffuse light to maintain a front contrast ratio and luminance.

A ratio W/B of the maximum width W of the engraved pattern 221 to a width B of the flat portion 222 may be 5 or less, specifically 0.1 to 3, more specifically 0.15 to 2. Within this range, relative front luminance may be enhanced, and a difference between a front contrast ratio and a side contrast ratio may be reduced, while contrast ratio under the same side viewing angle and the same front viewing angle being enhanced and a Moire phenomenon being suppressed. The width B of the flat portion 222 may be about him to about 300 µm, specifically 3 µm to 50 µm. Within this range, front luminance may be enhanced.

The maximum width W of one optical pattern 221 and an adjacent flat portion 222 may form one pitch P.

The pitch P may be in a range of about 5 μm to about 500 μm, specifically about 10 μm to about 50 μm. Within this range, luminance and contrast ratio may be enhanced while a Moire phenomenon being suppressed. FIG. 2 illustrates that a patterned portion has the same pitch with a neighboring patterned portion. However, the pitches may be different from each other, or at least one pitch of neighboring patterned portions may be different from each other.

FIG. 2 shows that the optical pattern is an engraved pattern. However, the optical pattern may be an embossed pattern. In addition, FIG. 2 shows that the optical pattern is formed in an extended form of a stripe shape, but the optical pattern may be formed in a dot shape. As used herein, the term "dot" means that combinations of a filling pattern and an optical pattern are dispersed. In some embodiment, the optical pattern may be an engraved pattern formed in an extended form of a stripe shape.

A refractive index of the second resin layer 220 may be higher than a refractive index of the first resin layer 210. The second resin layer 220 may include a patterned portion including optical patterns 221 and a flat portion 222 formed between the optical patterns 221, on a surface facing the first resin layer 210. The optical pattern 221 may include an inclined surface 223. Therefore, the contrast ratio enhancing layer 200 may diffuse polarized light incident from the polarizing film 100 and exit the polarized light to increase relative front luminance while simultaneously improving a front contrast ratio and a side contrast ratio. In addition, it is possible to minimize decrease of the front contrast ratio although the side contrast ratio is increased, and it is possible to reduce a difference between the front contrast ratio and the side contrast ratio while increasing a contrast ratio under the same side viewing angle and a contrast ratio under the same front viewing angle.

The second resin layer 220 may be formed on the first resin layer 210 and may diffuse light which arrives at the first resin layer 210 to increase light diffusion.

A refractive index of the second resin layer 220 may be higher than a refractive index of the first resin layer 210. An absolute value of a refractive index difference between the second resin layer and the first resin layer (a refractive index of the second resin layer—a refractive index of the first resin layer) may be 0.05 to 0.20, more specifically 0.06 to 0.15. Within this range, diffusion of collected light and a contrast ratio may increase. In particular, the contrast ratio enhancing layer having a refractive index difference of 0.06 to 0.12 may show an excellent diffusion effect of polarized light in an optical display device and may increase luminance under the same viewing angle. The second resin layer 220 may have a refractive index of 1.50 or more, specifically 1.50 to 1.70, 1.50 to 1.60. Within this range, light diffusion effect may be excellent. The second resin layer 220 may be formed of a UV curable composition or a heat curable composition including at least one of a (meth)acryl-based resin, a polycarbonate-based resin, a silicone-based resin, and an epoxy-based resin, without being limited thereto.

The first resin layer 210 may diffuse light by refracting and exiting light incident from a lower surface of an optical display device in various directions depending on an incident position. The first resin layer 210 may be formed directly in contact with the second resin layer 220.

The first resin layer 210 may include a filling pattern 211 which fills at least a portion of the optical pattern 221. As used herein, the term "fill at least a portion" includes both a structure in which the filling pattern completely fills the optical pattern and a structure in which the filling pattern partially fills the optical pattern. In the structure in which the filling pattern partially fills the optical pattern, a remaining or unfilled portion of the optical pattern may be filled with air or a resin having a predetermined refractive index. Specifically, the resin may have a refractive index which is equal to or higher than that of the first resin layer and is equal to or lower than that of the second resin layer.

The first resin layer 210 may have a refractive index of less than 1.52, specifically at least 1.35 and less than 1.50. Within this range, the first resin layer 210 may have an excellent light diffusion effect and may be easily prepared. The first resin layer 210 may be formed of a composition including a UV curable or heat curable resin including a transparent resin. For example, the resin may include at least one of a (meth)acryl-based resin, a polycarbonate-based resin, a silicone-based resin, and an epoxy-based resin, without being limited thereto. The transparent resin may have transmittance of about 90% or more as measured after being cured.

The contrast ratio enhancing layer 200 may be laminated on the polarizing film 100.

In one embodiment, the first resin layer may be non-adhesive. In this case, at least one of an adhesive layer, a bonding layer, or an adhesive/bonding layer may be formed between the first resin layer 210 and the polarizing film 100. In another embodiment, the first resin layer may have a self-adhesive property. In this case, the first resin layer 210 may be formed directly on the polarizing film 100. When the first resin layer has a self-adhesive property, the first resin layer may be formed of an adhesive resin including at least one of an acryl resin, an epoxy resin, and a urethane resin. The first resin layer may further include at least one of a curing agent, a silane coupling agent, and an additive in the adhesive resin.

At least one of an adhesive layer, a bonding layer, an adhesive/bonding layer, and the above-mentioned protective film may be further formed between the contrast ratio enhancing layer 200 and the polarizing film 100.

The contrast ratio enhancing layer 200 may have a thickness of 10 μm to 100 μm, specifically 20 μm to 60 μm, more specifically 20 μm to 45 μm. Within this range, the contrast ratio enhancing layer 200 may be used in an optical display device.

Antireflection Film

The antireflection film 300 is formed on the contrast ratio enhancing layer 200.

The antireflection film 300 may have minimum reflectance of 0.45% or less. Within this range, external light may be prevented from being color-dispersed by the optical pattern in the contrast ratio enhancing layer, and appearance may be improved. In some embodiments, the antireflection film may have minimum reflectance of 0% to 0.45%, 0.01% to 0.45%.

The antireflection film 300 may include a first base layer 310 and a laminate 320 of a high refractive index layer and a low refractive index layer.

The antireflection film 300 may be laminated on the contrast ratio enhancing layer 200 in the order of the first base layer 310, the high refractive index layer, and the low refractive index layer. The antireflection film 300 may have pencil hardness of 2H or more, for example 2H to 3H in the low refractive index layer. Within this range, the antireflection film 300 may be used at the outermost surface of the polarizing plate to protect the polarizing film.

The antireflection film 300 may have a thickness of 20 μm to 150 μm, for example 40 μm to 100 μm. Within this range, the antireflection film 300 may be used for a polarizing plate.

The first base layer 310 may support the antireflection film and increase mechanical strength of the antireflection film.

The first base layer 310 may have a refractive index of 1.40 to 1.80, for example 1.45 to 1.70, 1.48 to 1.50, 1.50 to 1.60. Within this range, minimum reflectance of the antireflection film may be lowered when the high refractive index layer and the low refractive index layer are sequentially laminated.

The first base layer 310 may be formed of an optically transparent resin. Specifically, the resin may include at least one of a cellulose ester resin including triacetyl cellulose (TAC) and the like, a polyester resin including polyethylene terephthalate, polyethylene naphthalate, polybutylene terephthalate, polybutylene naphthalate and the like, a polycarbonate resin, a poly(meth)acrylate resin including polymethylmethacrylate and the like, a polystyrene resin, a polyamide resin, and a polyimide resin. In some embodiments, the resin may include a cellulose ester resin including triacetyl cellulose and the like, a polyester resin including polyethylene terephthalate and the like.

The first base layer 310 may be a non-stretched film, but the first base layer 310 may be stretched by a predetermined method to be a retardation film or isotropic optical film having a predetermined range of retardation.

In one embodiment, the first base layer may have an in-plane retardation Re of 8,000 nm or more, specifically 10,000 nm or more, more specifically more than 10,000 nm, more specifically 10,100 nm to 15,000 nm. Within this range, rainbow spots may become invisible, and light diffused through the contrast ratio enhancing layer may be further diffused.

In another embodiment, the first base layer may be an isotropic optical film having an in-plane retardation Re of 60 nm or less, specifically 0 nm to 60 nm, more specifically 40 nm to 60 nm. Within this range, a viewing angle may be compensated to improve image quality. As used herein, the term "isotropic optical film" refers to a film having substantially the same nx, ny, and nz, and the term "substantially the same" includes not only completely identical cases but also cases including some errors.

In some embodiments, the first base layer may be an isotropic optical film having an in-plane retardation Re of 60 nm or less, specifically 0 nm to 60 nm, more specifically 40 nm to 60 nm. Within this time, the first base layer may be formed directly on the contrast ratio enhancing layer.

The first base layer 310 may have light transmittance of 80% or more, specifically 85% to 95% in a visible light region. Within this range, the first base layer may be used for a polarizing plate.

The first base layer 310 may include a base film and a primer layer formed on at least one surface of the base film. A ratio of a refractive index of the primer layer to a refractive index of the base film (a refractive index of the primer layer/a refractive index of the base film) is 1.0 or less, specifically 0.6 to 1.0, more specifically 0.69 to 0.95, more specifically 0.7 to 0.9, more specifically 0.72 to 0.88. Within this range, transmittance of the first base layer may be increased. The base film may have a refractive index of 1.3 to 1.7, specifically 1.4 to 1.6. Within this range, the base film may be used as a base film of the first base layer, and a refractive index with respect to the primer layer is easily controlled, while transmittance of the first base layer being increased. The base film may include a film formed of the resin described above. The primer layer may have a refractive index of 1.0 to 1.6, specifically 1.1 to 1.6, more specifically 1.1 to 1.5. Within this range, transmittance of the base layer may be increased by having an appropriate refractive index with respect to the base film. The primer layer may have a thickness of 1 nm to 200 nm, specifically 60 nm to 200 nm. Within this range, the primer film may be used for an optical film and have an appropriate refractive index with respect to the base film to increase transmittance of the base layer and prevent brittle phenomenon. The primer layer may be a non-urethane primer layer not containing a urethane group. Specifically, the primer layer may be formed of a composition for a primer layer including a monomer or a resin such as polyester, acryl, and the like. The above-described range of refractive index may be provided by controlling a mixing ratio (e.g., molar ratio) of these monomers. The composition for the primer layer may further include at least one additive such as a UV absorber, an antistatic agent, a defoaming agent, a surfactant, and the like.

The first base layer 310 may have a thickness of 10 μm to 150 μm, specifically 30 μm to 100 μm, more specifically 40 μm to 90 μm. Within this range, the first base layer 310 may be used in an antireflection film.

The high refractive index layer may be formed on the first base layer to increase hardness of the antireflection film and lower minimum reflectance of the antireflection film together with the low refractive index layer. The high refractive index layer may be a single layer, or two or more high refractive index layers having different refractive indices may be laminated.

The high refractive index layer may have a refractive index higher than a refractive index of the low refractive index layer. The high refractive index layer may have a refractive index of 1.53 to 1.70, for example 1.56 to 1.65. Within this range, minimum reflectance of the antireflection film may be lowered when the low refractive index layer is laminated on the high refractive index layer.

The high refractive index layer may have a thickness of 1 μm to 50 μm, specifically 1 μm to 30 μm, more specifically 5 μm to 10 μm. Within this range, the high refractive index layer may be used for an antireflection film and may secure hardness.

The high refractive index layer may be formed of a composition for the high refractive index layer which may provide a refractive index of 1.53 to 1.70 after being cured. The composition for the high refractive index layer may have a refractive index of 1.53 to 1.70, for example 1.55 to 1.65.

In one embodiment, the composition for the high refractive index layer may include a high refractive index compound having a refractive index of 1.6 or more, specifically 1.615 to 1.635, more specifically 1.62 to 1.63, a UV curable compound having a refractive index lower than a refractive index of the high refractive index compound, an initiator, and an inorganic particle.

The high refractive index compound may be a UV curable compound and may include at least one of a high refractive index monomer or a high refractive index resin such as a fluorene-based compound, a biphenyl-based compound, a bisphenol-based compound, a thiophenyl-based compound, a thiobenzyl-based compound, a phenylsulfide-based compound, and a thionaphthalene-based compound. In some embodiments, by using at least one of a fluorene-based compound and a biphenyl-based compound as the high refractive index compound, a refractive index of the high refractive index layer may be increased to further lower minimum reflectance of the antireflection film.

The fluorene-based compound may be a resin represented by following Formula 1, without being limited thereto.

[Formula 1]

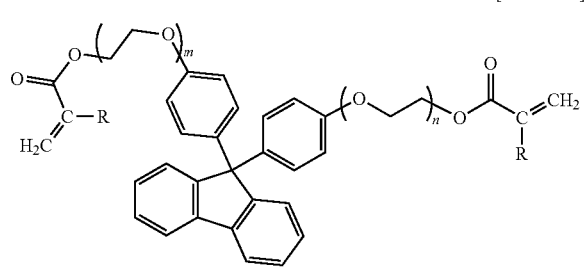

wherein, m and n are each an integer of 1 or more, m+n is an integer of 2 to 8, and R is hydrogen or a methyl group. In some embodiments, m+n may be an integer of 4. In this case, a refractive index and hardness of a cured product may be increased when used together with a UV curable compound, and minimum reflectance may be lowered to be 0.45% or less when a low refractive index layer described below is laminated on the high refractive index layer.

The high refractive index monomer may have a refractive index higher than a refractive index of the UV curable compound and the high refractive index monomer may have a viscosity lower than a viscosity of the high refractive index resin, so that applicability of the composition for the high refractive index layer may be improved.

The high refractive index monomer may have a refractive index of 1.55 or more, specifically 1.56 to 1.59, more specifically 1.57 to 1.58. Within this range, a refractive index of the cured product may be increased to lower minimum reflectance of the antireflection film. In one embodiment, the high refractive index monomer may include a compound represented by following Formula 2. The high refractive index monomer may use a commercially available product or be synthesized by a conventional method:

[Formula 2]

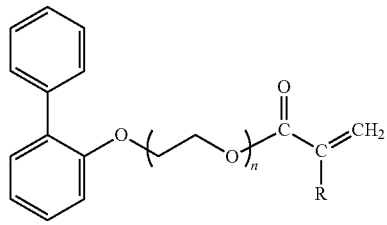

wherein, n is an integer of 1 to 4, and R is hydrogen or a methyl group.

The high refractive index compound may be present in the composition for the high refractive index layer in an amount of 5 wt % to 60 wt %, for example 10 wt % to 45 wt % in terms of solid content. Within this range, minimum reflectance may be sufficiently lowered when a low refractive index layer is laminated on the high refractive index layer, and hardness of an antireflection film may be sufficiently increased. As used herein, the term "solid content" means an entirety of a composition except for a solvent and is not limited to a liquid or solid phase.

The UV curable compound may have a refractive index lower than a refractive index of the high refractive index compound. However, the UV curable compound may form a matrix of a high refractive index layer and increase hardness of the high refractive index layer. A composition including only a high refractive index compound may lower hardness of the antireflection film and may not be used in an optical display device. In some embodiments, the UV curable compound may have a UV curable group such as a (meth)acrylate group or an epoxy group. The UV curable compound may include at least one of a bifunctional or higher polyfunctional (meth)acrylate monomer, an oligomer formed therefrom, and a resin formed therefrom. For example, the UV curable compound may be a bifunctional to 10-functional (meth)acrylate compound.

The UV curable compound may include at least one of a polyfunctional (meth)acrylate such as an ester of a polyhydric alcohol and a (meth)acrylic acid, or polyfunctional urethane (meth)acrylate synthesized from a polyhydric alcohol, an isocyanate compound, or hydroxy ester of a (meth)acrylic acid.

The UV curable compound may include a bifunctional or higher (meth)acrylate compound. Examples of the bifunctional (meth)acrylate compound may include di(meth)acrylate such as ethylene glycol di(meth)acrylate, diethylene glycol di(meth)acrylate, butanediol di(meth)acrylate, hexanediol di(meth)acrylate, nonanediol di(meth)acrylate, ethoxylated hexanediol di(meth)acrylate, propoxylated hexanediol di(meth)acrylate, diethylene glycol di(meth)acrylate, polyethylene glycol di(meth)acrylate, tripropylene glycol di(meth)acrylate, polypropylene glycol di(meth)acrylate, neopentyl glycol di(meth)acrylate, ethoxylated neopentyl glycol di(meth)acrylate, tripropylene glycol di(meth)acrylate and hydroxypivalic acid neopentyl glycol di(meth)acrylate. Examples of the trifunctional or higher (meth)acrylate compound may include tri(meth)acrylate such as trimethylolpropane tri(meth)acrylate, ethoxylated trimethylolpropane tri(meth)acrylate, propoxylated trimethylolpropane tri(meth)acrylate, tris 2-hydroxyethyl isocyanurate tri(meth)acrylate and glyceryl tri(meth)acrylate, a trifunctional (meth)acrylate compound such as pentaerythritol tri(meth)acrylate, dipentaerythritol tri(meth)acrylate, and ditrimethylolpropane tri(meth)acrylate, a polyfunctional (meth)acrylate compound having three or more functional groups such as pentaerythritol tetra(meth)acrylate, ditrimethylolpropane tetra(meth)acrylate, dipentaerythritol tetra(meth)acrylate, dipentaerythritol penta(meth)acrylate, ditrimethylolpropane penta(meth)acrylate, dipentaerythritol hexa(meth)acrylate, ditrimethylolpropane hexa(meth)acrylate, or a polyfunctional (meth)acrylate compound in which a part of these (meth)acrylates are substituted with an alkyl group or ε-caprolactone.

The UV curable compound may be present in the composition for the high refractive index layer in an amount of 20 wt % to 60 wt % in terms of solid content. Within this range, a matrix of the high refractive index layer may have high hardness. In some embodiments, the UV curable compound may be present in an amount of 35 wt % to 60 wt %, 35 wt % to 50 wt %. Within this range, minimum reflectance may be sufficiently lowered when a low refractive index layer is laminated on the high refractive index layer, and hardness of the antireflection film may be sufficiently increased.

The initiator may cure the high refractive index compound and the UV curable compound to form a high refractive index layer. The initiator may include at least one of a conventional photo radical initiator and a photo cationic initiator known to those skilled in the art. Although not particularly limited, use of an initiator having an absorption wavelength of 400 nm or less enables production of a high refractive index layer by photocuring alone.

The photo radical initiator may generate a radical by light irradiation to catalyze a curing process. Examples of the photo radical initiator may include at least one of phosphorous, triazine, acetophenone, benzophenone, thioxanthone, benzoin, oxime and phenyl ketone. The photo cationic initiator may include a salt of a cation and an anion. Examples of the cation may include diaryliodonium such as diphenyl iodonium, 4-methoxydiphenyl iodonium, bis(4-methylphenyl) iodonium, (4-methylphenyl)[4-(2-methylpropyl)phenyl] iodonium, bis(4-tert-butylphenyl)iodonium, bis(dodecylphenyl iodonium, triarylsulfonium such as triphenylsulfonium and diphenyl-4-thiophenoxyphenylsulfonium, bis[4-(diphenyl sulfonio)phenyl]sulfide, bis[4-(di(4-(2-hydroxyethyl)phenyl) sulfonio)phenyl]sulfide, (η5-2,4-cyclopentadien-1-yl)[(1,2,3,4,5,6-η)-(1-methylethyl) benzene]iron(1+), and the like. Examples of the anion may include tetrafluoroborate ($BF_4^-$), hexafluorophosphate ($PF_6^-$), hexafluoroantimonate ($SbF_6^-$), hexafluoroarsenate ($AsF_6^-$), hexachloroantimonate ($SbCl_6^-$) and the like.

The initiator may be present in the composition for the high refractive index layer in an amount of 2 wt % to 5 wt %, for example 2 wt % to 4 wt % in terms of solid content. Within this range, the composition may be sufficiently cured, and transmittance of the antireflection film may be prevented from being lowered due to the residual amount of initiator.

The inorganic particle may increase a refractive index and hardness of the high refractive index layer. The surface of the inorganic particle may not be treated or treated (e.g., with a (meth)acrylate group) to improve compatibility with other components in the composition and further increase hardness of the high refractive index layer. The surface treatment may be performed to 5% to 50% of a total surface area of the inorganic particle. Within this range, hardness may increase through bonding with the UV curable compound and the high refractive index resin. The inorganic particle may include at least one of silica, zirconia, titania, and alumina, and zirconia may be used in one embodiment. The inorganic particle may have an average particle diameter D50 of 1 nm to 50 nm, specifically 5 nm to 20 nm. Within this range, the antireflection film may have increased hardness without deterioration in optical properties.

The inorganic particle may be present in the composition for the high refractive index layer in an amount of 2 wt % to 35 wt %, for example 5 wt % to 30 wt % in terms of solid content. Within this range, the antireflection film may have increased hardness without deterioration in optical properties.

The composition for the high refractive index layer may further include an antistatic agent.

The antistatic agent may lower surface resistance of the antireflection film. In one embodiment, the antireflection film may have surface resistance of $9\times10^{10}\Omega/\square$ or less, for example $1\times10^{10}\Omega/\square$ or less in the low refractive index layer.

The antistatic agent may include a conventional antistatic agent known to those skilled in the art. For example, the antistatic agent may include a material having a quaternary ammonium cation and an anion. Examples of the anion may include a halogen ion, $HSO_4^-$, $SO_4^{2-}$, $NO_3^-$, $PO_4^{3-}$, and the like. The antistatic agent may include a quaternary ammonium cation but may include an acrylic material including a quaternary ammonium cation as a functional group in the molecule.

The antistatic agent may be present in the composition for the high refractive index layer in an amount of 2 wt % to 10 wt %, for example 3 wt % to 7 wt %, in terms of solid content. Within this range, an antistatic effect can be obtained without affecting hardness of the antireflection, and property deterioration such as hardness deterioration may be prevented while migration of the antistatic agent being prevented.

The composition for the high refractive index layer may further include a conventional additive known to those skilled in the art. For example, an antifoaming agent, an antioxidant, a UV absorber, a light stabilizer, a leveling agent and the like may be included, without being limited thereto. The composition for the high refractive index layer may further include a solvent to improve a coating property of the composition for the high refractive index layer. The solvent may include at least one of propylene glycol monomethyl ether and methyl ethyl ketone.

The low refractive index layer may be formed on the high refractive index layer and have a refractive index lower than a refractive index of the high refractive index layer, so that minimum reflectance of the antireflection film may be lowered. A refractive index difference between the high refractive index layer and the low refractive index layer (refractive index of the high refractive index layer–refractive index of the low refractive index layer) may be 0.26 or more, for example 0.26 to 0.30. Within this range, the refractive index of the antireflection film may be lowered and optical characteristics such as haze may be improved. The low refractive index layer may have a refractive index of 1.35 or less, for example 1.25 to 1.32.

The low refractive index layer may have a thickness of 50 nm to 300 nm, for example 80 nm to 200 nm, specifically 80 nm to 150 nm. Within this range, the low refractive index layer may be used in an antireflection film.

The low refractive index layer may be formed of a composition for a low refractive index layer. The composition for a low refractive index layer may include an inorganic particle, a fluorine-containing monomer or an oligomer thereof, a fluorine-free monomer or an oligomer thereof, an initiator, and a fluorine-containing additive.

The inorganic particle may have a hollow structure and a low refractive index to lower a refractive index of the low refractive index layer. The inorganic particle may have a refractive index of 1.4 or less, for example 1.2 to 1.38. The inorganic particle may include hollow silica. The inorganic particle may include an untreated hollow particle, or the surface of the inorganic particle may be treated with a UV-curable functional group. An average particle diameter D50 of the inorganic particle is equal to or less than the thickness of the low refractive index layer. The average particle diameter D50 of the inorganic particle may be 30 nm to 150 nm, for example 50 nm to 100 nm. Within this range, the inorganic particle may be included in the low refractive index layer, and optical properties such as haze and transmittance may be improved.

The fluorine-containing monomer or an oligomer thereof may lower the refractive index of the low refractive index layer together with the inorganic particle and form a matrix of the low refractive index layer together with the fluorine-free monomer or the oligomer thereof. The fluorine-containing monomer may include a fluorine-containing (meth)acrylate-based compound. The fluorine-containing monomer may include a conventional compound known to those skilled in the art.

The fluorine-free monomer or the oligomer thereof may form a matrix of the low refractive index layer and may include a UV curable compound. The fluorine-free monomer or the oligomer thereof may be a bifunctional or more, for example bifunctional to 10-functional (meth)acrylate compound. Specifically, the fluorine-free monomer may include the above-described polyfunctional (meth)acrylate such as an ester of a polyhydric alcohol and a (meth)acrylic acid.

An initiator which is the same as or different from the initiator described in the composition for the high refractive index layer may be used.

The additive may add an anti-contamination property and a slimming property to the low refractive index layer, and a conventional additive known to those skilled in the art may be used. The additive may include at least one of a fluorine-containing additive and a silicon-based additive. The fluorine-containing additive may be a UV-curable fluorinated acrylic compound. For example, KY-1200 series including KY-1203 (Shin-Etsu Chemical) may be used.

The composition for a low refractive index layer may include 20 wt % to 70 wt % of the inorganic particle, 10 wt % to 50% of the fluorine-containing monomer or the oligomer thereof, 5 wt % to 25 wt % of the fluorine-free monomer or the oligomer thereof, 2 wt % to 5 wt % of the initiator, and 1 wt % to 10 wt % of the additive, in terms of solid content. Within this range, pencil hardness of 2H or more and anti-fingerprint effect may be provided. In some embodiments, the composition for a low refractive index layer may include 40 wt % to 60 wt % of the inorganic particle, 20 wt % to 40 wt % of the fluorine-containing monomer or the oligomer thereof, 5 wt % to 15 wt % of the fluorine-free monomer or the oligomer thereof, 2 wt % to 4 wt % of the initiator, and 2 wt % to 7 wt % of the additive, in terms of solid content.

The composition for a low refractive index layer may further include a conventional additive known to those skilled in the art. For example, an antifoaming agent, an antioxidant, a UV absorber, a light stabilizer, a leveling agent and the like may be included, without being limited thereto.

The composition for a low refractive index layer may further include a solvent to improve a coating property. The solvent may include at least one of methyl ethyl ketone, methyl isobutyl ketone, and ethylene glycol dimethyl ether.

The antireflection film 300 may be formed directly on the contrast ratio enhancing layer 200. In other words, the patterned portion is formed after the composition for the second resin layer was coated onto the first base layer 310 of the antireflection film 300, and the patterned portion is filled with the composition for the first resin layer 210, therefore, the second resin layer 220 of contrast ratio enhancing layer 200 formed directly on the first base layer 310 of the antireflection film 300. Alternatively, the second resin layer 220 may have a self-adhesive property, and the antireflection film 300 may be attached to the contrast ratio enhancing layer 200. Alternatively, an adhesive layer, a bonding layer, or an adhesive/bonding layer may be interposed between the antireflection film 300 and the contrast ratio enhancing layer 200.

Hereinafter, a polarizing plate according to another embodiment of the invention will be described with reference to FIG. 4.

Referring to FIG. 4, a polarizing plate 20 is substantially the same as the polarizing plate 10 according to an embodiment of the invention, except that a second base layer 400 and an adhesive layer 500 are further laminated between a contrast ratio enhancing layer 200 and an antireflection layer 300. Referring to FIG. 4, the contrast ratio enhancing layer 200, the second base layer 400, the adhesive layer 500, and the antireflection film 300 are laminated in this order on a polarizing film 100.

The second base layer 400 may be formed between the contrast ratio enhancing layer 200 and the antireflection film 300 to increase mechanical strength of the polarizing plate. Further, when a first base layer 310 of the antireflection film is a non-stretched film or an isotropic optical film, an additional function may be provided to the polarizing plate by using a retardation film as the second base layer.

The second base layer 400 may be formed of a resin which is the same as or different from the above-mentioned first base layer. The second base layer 400 may have a thickness which is the same as or different from the thickness of the above-mentioned first base layer. The second base layer 400 may have a retardation which the same as or different from a retardation of the above-mentioned first base layer. In some embodiments, the second base layer may have an in-plane retardation Re of 8,000 nm or more, specifically 10,000 nm or more, more specifically more than 10,000 nm, more specifically 10,100 nm to 15,000 nm.

The second base layer 400 may be formed directly on the contrast ratio enhancing layer 200. Also, although not shown in FIG. 4, the second base layer 400 may be formed on the contrast ratio enhancing layer 200 interposed by an adhesive/bonding layer.

The adhesive layer 500 may bond the second base layer 400 and the antireflection film 300.

The adhesive layer 500 may be formed of a composition for an adhesive layer including an adhesive resin and a curing agent. The adhesive resin may include at least one of a (meth)acrylic adhesive resin, an epoxy adhesive resin, a silicone adhesive resin and a urethane adhesive resin. The curing agent may include a conventional curing agent known to those skilled in the art. For example, the curing agent may include at least one of an isocyanate-based curing agent, an epoxy-based curing agent, a melamine-based curing agent, an aziridine-based curing agent, and an amine-based curing agent. The composition for an adhesive layer may include at least one of a silane coupling agent, a crosslinking agent, and a variety of additives.

The adhesive layer 500 may further include a light scattering agent. The light scattering agent may scatter external light incident on the polarizing plate to improve black visual sensitivity of a screen of a display device during non-driving. The light scattering agent may be a spherical particle having an average particle diameter of 0.51 µm to 50 µm, for example 1 µm to 10 µm. The light scattering agent may include at least one of an inorganic light scattering agent, an organic light scattering agent, or an organic-inorganic hybrid light scattering agent. The inorganic light scattering agent, the organic light scattering agent, and the organic-inorganic hybrid light scattering agent may include a conventional light scattering agent known to those skilled in the art. In some embodiments, the light scattering agent may include an organic light scattering agent. Specifically, the light scattering agent may include at least one of an organic particle such as a (meth)acryl-based polymer resin for example polymethylmethacrylate or a methacrylate ester copolymer, a urethane-based polymer resin, an epoxy-based polymer resin, a vinyl-based polymer resin, a polyester-based polymer resin, a polyamide-based polymer resin, a polystyrene-based polymer resin, or a silicone-based polymer resin and an inorganic particle such as titanium oxide, zirconium oxide, and the like.

The adhesive layer 500 may have a refractive index of 1.40 to 1.65. Within this range, optical loss due to the adhesive layer may be minimized and luminous reflectance may be lowered through the reflectance reduction effect.

The adhesive layer 500 may have a thickness of 1 µm to 50 µm, for example 5 µm to 20 µm. Within this range, the adhesive layer may be used in a polarizing plate, and the second base layer and the antireflection film may be bonded well.

The adhesive layer 500 may have a haze of 40% or less, for example 1% to 40%. Within this range, appearance of an optical display device may be improved when the optical display device is not driven, and side contrast ratio may not be decreased due to the contrast ratio enhancing layer during driving of the optical display device.

In some embodiments, a laminate of a second base layer having an in-plane retardation Re of 8,000 nm or more and an adhesive layer having a refractive index of 1.40 to 1.65 may be included between the contrast ratio enhancing layer and the antireflection film to ensure a reflectance slope of 0.3 or less and improve visibility.

Hereinafter, a polarizing plate according to another embodiment of the invention will be described with reference to FIG. 5. FIG. 5 is a cross-sectional view of a polarizing plate according to another embodiment of the invention.

Referring to FIG. 5, a polarizing plate 30 may include a first resin layer 210' and a second resin layer 220' sequentially laminated on a polarizing film 100, and the polarizing plate 30 is substantially the same as the polarizing plate 10 according to an embodiment of the invention, except that the second resin layer 220' included in a contrast ratio enhancing layer 200C having a refractive index lower than that of the first resin layer 210'.

At this time, an absolute value of a refractive index difference between the second resin layer and the first resin layer (a refractive index of the first resin layer—a refractive index of the second resin layer) may be 0.05 to 0.20, more specifically 0.06 to 0.15. Within this range, collected light may be diffused well and a contrast ratio may be improved largely. In particular, a contrast ratio enhancing layer having a refractive index difference of 0.06 to 0.12 may have an excellent polarizing diffusion effect in an optical display device and may increase luminance even under the same viewing angle. The first resin layer may have a refractive index of 1.50 or more, specifically 1.50 to 1.70, 1.50 to 1.60. The second resin layer may have a refractive index of less than 1.52, specifically at least 1.35 and less than 1.50. Within this range, light may be diffused well while production is facilitated, and polarized light will be diffused well while a contrast ratio being improved.

Hereinafter, a polarizing plate according to another embodiment of the invention will be described with reference to FIG. 6. FIG. 6 is a cross-sectional view of a polarizer according to another embodiment of the invention.

Referring to FIG. 6, a polarizing plate 40 may include a first resin layer 210' and a second resin layer 220' sequentially laminated on a polarizing film 100, and the polarizing plate 40 is substantially the same as the polarizing plate 20 according to another embodiment of the invention, except that the second resin layer 220' included in a contrast ratio enhancing layer 200C having a refractive index lower than that of the first resin layer 210'.

A refractive index relationship between the first resin layer and the second resin layer is the same as described in the polarizing plate 30.

A liquid crystal display of the invention may include the polarizing plate of the invention as a viewer side polarizing plate with respect to a liquid crystal panel. As used herein, the "viewer side polarizing plate" means a polarizing plate disposed near a screen, i.e., opposite of a light source, with respect to the liquid crystal panel.

In one embodiment, a liquid crystal display device may include a backlight unit, a first polarizing plate, a liquid crystal panel, and a second polarizing plate, which are sequentially laminated in this order, and the second polarizing plate may include the polarizing plate according to embodiments of the invention. The liquid crystal panel may employ a vertical alignment (VA) mode, an in-plane switching (IPS) mode, a patterned vertical alignment (PVA) mode, or a super-patterned vertical alignment (S-PVA) mode, without being limited thereto.

Hereinafter, the invention will be described in more detail with reference to some examples. It should be understood that these examples are provided for illustration only and are not to be construed in any way as limiting the invention.

Example 1

A polarizer (thickness: 23 μm) was prepared by stretching a polyvinyl alcohol film at 60□ to 3 times an initial length thereof and adsorbing iodine to the stretched film, followed by stretching the resulting film to 2.5 times the stretched length of the film in an aqueous solution of boric acid at 40□.

A polarizing film was prepared by bonding a cycloolefin (COP) film (thickness: 50 μm, ZEON Corporation) to one surface of the above-prepared polarizer and a triacetyl cellulose (TAC) film (thickness: 60 μm, Fujifilm Corporation) to another surface of the polarizer using a bonding agent for a polarizing plate (Z-200, Nippon Goshei Co., Ltd.).

A coating layer was prepared by coating a UV curable resin (SSC-5710, Shina T&C) onto one surface of a first base layer of an antireflection film (DNP, first base film: TAC film (Re: 0 nm at a wavelength of 550 nm) having a thickness of 60 μm, minimum reflectance: 0.39%). An engraved pattern and a flat portion were applied to the coating layer using a film including a patterned portion having an embossed pattern with two same base angles and a flat portion between the embossed patterns, followed by curing to prepare a second resin layer including a patterned portion having an engraved pattern with two same base angles (engraved pattern having a trapezoidal cross-section of FIG. 1) and a flat portion. A heat curable adhesive resin (acrylic copolymer, Saiden Chemical Industry Co., Ltd.) was coated onto the second resin layer to form a first resin layer (self-adhesive property) having a filling pattern which completely fills the engraved pattern, followed by forming a laminate of an antireflection film and a contrast ratio enhancing layer. Table 1 below shows detailed specifications of the engraved pattern.

A polarizing film was laminated on one surface of the first resin layer of the laminate to prepare a polarizing plate in which a COP film (thickness: 50 μm), a polarizer (thickness: 23 μm), a TAC film (thickness: 60 μm), a first resin layer (refractive index: 1.48), a second resin layer (refractive index: 1.60), and an antireflection film (first base layer: TAC film having a thickness of 60 μm, minimum reflectance: 0.39%) were sequentially laminated.

Example 2

A polarizing film was prepared in the same manner as in Example 1 by boding a COP film (thickness: 50 μm, ZEON Corporation) to one surface of a polarizer (thickness: 23 μm) and bonding a PET film (thickness: 80 μm, SRF, Toyobo Co., Ltd.) to another surface of the polarizer using a bonding agent for a polarizing plate (Z-200, Nippon Goshei Co., Ltd.).

A contrast ratio enhancing layer was prepared in the same manner as in Example 1 on one surface of a PET film (thickness: 80 µm, SRF, Re: 8,000 nm or more, Toyobo Co., Ltd.) as a second base layer.

The first resin layer of the contrast ratio enhancing layer were laminated on one surface of the PET film of the polarizing film.

An antireflection film (DNP Co., Ltd., first base layer: TAC film (Re: 0 nm at a wavelength of 550 nm) having a thickness of 60 µm, minimum reflectance: 0.39%) was laminated on another surface of the second base layer using an adhesive layer (refractive index: 1.48) to prepare a polarizing plate in which a COP film (thickness: 50 µm), a polarizer (thickness: 23 µm), a PET film (thickness: 80 µm), a first resin layer (refractive index: 1.48), a second resin layer (refractive index: 1.60), a PET film as a second base layer (thickness: 80 µm), an adhesive layer (refractive index: 1.48) and an antireflection film (first base layer: TAC film having a thickness of 60 µm, minimum reflectance: 0.39%) were sequentially laminated.

Example 3

A polarizing plate was prepared in the same manner as in Example 2, except that the PET film included in the polarizing film and the PET film as the second base layer were changed to a TAC film (thickness: 60 µm, Fujifilm Corporation), respectively, and the antireflection film was changed to an antireflection film (TAC film as a first base film (Re: 0 nm at a wavelength of 550 nm) having a thickness of 60 µm, minimum reflectance: 0.29%, Toppan Co., Ltd.).

Example 4

A polarizing plate was prepared in the same manner as in Example 2, except that the PET film included in the polarizing film and the PET film as the second base layer were changed to a TAC film (thickness: 60 µm, Fujifilm Corporation), respectively, and the antireflection film was changed to an antireflection film (TAC film as a first base film having a thickness of 60 µm, minimum reflectance: 0.19%, Toppan Co., Ltd.).

Example 5

A polarizing plate was prepared in the same manner as in Example 2, except that the PET film included in the polarizing film and the PET film as the second base layer were changed to a TAC film (thickness: 60 µm, Fujifilm Corporation), respectively, and the second resin layer was changed to a second resin layer having a refractive index of 1.54 using a UV curable resin (SSC-5100, Shina T&C), while the antireflection film being changed to an antireflection film (TAC film as a first base film (Re: 0 nm at a wavelength of 550 nm) having a thickness of 60 µm, minimum reflectance: 0.19%, Toppan Co., Ltd.).

Example 6

A polarizing plate was prepared in the same manner as in Example 2, except that the antireflection film was changed to an antireflection film (TAC film as a first base film (Re: 0 nm at a wavelength of 550 nm) having a thickness of 60 µm, minimum reflectance: 0.19%, Toppan Co., Ltd.).

Example 7

A polarizing plate was prepared in the same manner as in Example 2, except that the second resin layer was changed to a second resin layer having a refractive index of 1.54 using a UV curable resin (SSC-5100, Shina T&C), and the antireflection film was changed to an antireflection film (TAC film as a first base film having a thickness of 60 µm, minimum reflectance: 0.19%, Toppan Co., Ltd.).

Example 8

A polarizing plate was prepared in the same manner as in Example 2, except that the antireflection film was changed to an antireflection film (TAC film as a first base film having a thickness of 60 µm, minimum reflectance: 0.09%, Toppan Co., Ltd.).

Example 9

A polarizer was prepared in the same manner as in Example 1.

A polarizing film was prepared by bonding a COP film (thickness: 50 µm, ZEON Corporation) to one surface of the above-prepared polarizer and a PET film (thickness: 80 µm, SRF, Toyobo Co., Ltd.) to another surface of the polarizer using a bonding agent for a polarizing plate (Z-200, Nippon Goshei Co., Ltd.).

A coating layer was prepared by coating a UV curable resin (SSC-4560, Shina T&C) onto one surface of a first base layer of an antireflection film (Toppan Co., Ltd., first base film: TAC film (Re: 0 nm at a wavelength of 550 nm) having a thickness of 60 µm, minimum reflectance: 0.29%). An engraved pattern and a flat portion were applied to the coating layer using a film including a patterned portion having an embossed pattern with two same base angles and a flat portion between the embossed patterns, followed by curing to prepare a second resin layer including a patterned portion having an engraved pattern with two same base angles (engraved pattern having a trapezoidal cross-section of FIG. 1) and a flat portion. A UV curable resin (SSC-5710, Shina T&C) was coated onto the second resin layer to form a first resin layer (self-adhesive property) having a filling pattern which completely fills the engraved pattern, followed by forming a laminate of an antireflection film and a contrast ratio enhancing layer. Table 1 below shows detailed specifications of the engraved pattern.

The polarizing film was laminated on one surface of the first resin layer of the laminate to prepare a polarizing plate in which a COP film (thickness: 50 µm), a polarizer (thickness: 23 µm), a PET film (thickness: 80 µm), a first resin layer (refractive index: 1.60), a second resin layer (refractive index: 1.48), and an antireflection film (first base layer: TAC film having a thickness of 60 µm, minimum reflectance: 0.29%) were sequentially laminated.

Example 10

A polarizing film was prepared in the same manner as in Example 9 by bonding a COP film (thickness: 50 µm, ZEON Corporation) to one surface of the above-prepared polarizer and a PET film (thickness: 80 µm, SRF, Toyobo Co., Ltd.) to another surface of the polarizer using a bonding agent for a polarizing plate (Z-200, Nippon Goshei Co., Ltd.)

A contrast ratio enhancing was formed in the same manner as in Example 9 on one surface of a PET film (thickness: 80 μm, SRF, Re: 8,000 nm or more, Toyobo Co., Ltd.) as a second base layer.

A first resin layer was laminated on one surface of the PET film of the polarizing film and an antireflection film (Toppan Co. Ltd., first base layer: TAC film (Re: 0 nm at a wavelength of 550 nm) having a thickness of 60 μm, minimum reflectance: 0.09%) was laminated on another surface of the second base layer by an adhesive (refractive index: 1.48) to prepare a polarizing plate in which a COP film (thickness: 50 μm), a polarizer (thickness: 23 μm), a PET film (thickness: 80 μm), a first resin layer (refractive index: 1.60), a second resin layer (refractive index: 1.48), a PET film as a second base layer (thickness: 80 μm), an adhesive layer (refractive index: 1.48), and an antireflection film (first base layer: TAC film having a thickness of 60 μm, minimum reflectance: 0.09%) were sequentially laminated.

Comparative Example 1

A polarizing plate was prepared in the same manner as in Example 1, except that a contrast ratio enhancing was not formed.

Comparative Example 2

A polarizing plate was prepared in the same manner as in Example 1, except that an antireflection film (TAC film as a first base layer, minimum reflectance: 1%) was used as the antireflection film.

Comparative Example 3

A polarizing plate was prepared in the same manner as in Example 1, except that an antireflection film (TAC film as a first base layer, minimum reflectance: 0.46%) was used as the antireflection film.

Comparative Example 4

A polarizing plate was prepared in the same manner as in Example 1, except that a contrast ratio enhancing layer having an engraved pattern shown in Table 1 below was used. The patterned portion had a value of 6.21 as represented by Equation 1 above.

Comparative Example 5

A polarizing plate was prepared in the same manner as in Example 1, except that a contrast ratio enhancing layer having an engraved pattern shown in Table 1 below was used. The patterned portion had no flat portion.

Comparative Example 6

A polarizing plate was prepared in the same manner as in Example 1, except that a contrast ratio enhancing layer having an engraved pattern shown in Table 1 below was used. The engraved pattern had a base angle of 67.4°.

TABLE 1

| | Shape of engraved pattern | Width of first surface (flat surface) of engraved pattern | Maximum width of engraved pattern (μm) | Height of engraved pattern (μm) | Base angle of engraved pattern (°) | Width of flat portion (μm) | Pitch (μm) |
|---|---|---|---|---|---|---|---|
| Examples 1 to 10, Comparative Examples 2 & 3 | Cut-prism | 6.5 | 7.4 | 6.6 | 86.1 | 6.9 | 14.3 |
| Comparative Example 4 | Cut-prism | 17.6 | 20.3 | 5.1 | 75.17 | 3.9 | 24.2 |
| Comparative Example 5 | Prism | — | 8.2 | 15.7 | 75.36 | — | 8.2 |
| Comparative Example 6 | Cut-prism | 3.5 | 9.4 | 7.1 | 67.4 | 3.5 | 12.9 |

Properties of the polarizing plates of Examples and Comparative Examples listed in Table 2 were evaluated. The results are shown in Table 2, FIG. 7, and FIG. 8.

(1) Reflectance: A black acrylic sheet (Nitto Jushi Kogyo Co., Ltd., CLAREX) was laminated on each polarizing film of the polarizing plate of Examples and Comparative Examples to prepare a specimen. Reflectance was measured in a wavelength range of 360 nm to 740 nm at intervals of 10 nm in SCI reflection mode (light source: D65, light source diameter: φ 25.4 mm, measurement viewing angle: 2°) with a spectrophotometer (Konica Minolta Co., Ltd., CM-3600A). Reflectance at a wavelength of 500 nm and reflectance at a wavelength of 600 nm were obtained.

(2) Reflectance slope: Reflectance slope was calculated according to Equation 2 above using the reflectance measured in Reflectance (1).

(3) Luminous reflectance: A specimen was prepared in the same manner as in Reflectance (1), and luminous reflectance Y (D65) was evaluated under the following conditions:
device: Spectrophotometer CM-3600A
light source: D65
light source diameter φ: 25.4 mm
measurement viewing angle: 2°

(4) Appearance evaluation: Each polarizing plate of Examples and Comparative
Examples was placed on a liquid crystal panel with the antireflection film facing uppermost, and a 3-band fluorescent lamp (OSRAM GmbH) was placed at a height of 30 cm from the antireflection film, followed by lighting, visual evaluating and scoring of visual appearance. The score was evaluated from 1 point to 5 points. As the score moved from 5 points to 1 point, appearance was improved. 5 points showed splitting of reflected light and bad black visual sensitivity, and 1 point showed no splitting of reflected light and good black visual sensitivity. 5 points means that the device is not used for a display device due to bad black visual sensitivity.

(5) Relative luminance and relative side contrast ratio: A module for a liquid crystal display device was manufactured and relative luminance and relative side contrast ratio were evaluated in the following manner.

Preparation Example 1: Preparation of First Polarizing Plate

A first polarizer was prepared by stretching a polyvinyl alcohol film at 60□ to 3 times an initial length thereof and adsorbing iodine to the stretched film, followed by stretching the resulting film to 2.5 times the stretched length of the film in an aqueous solution of boric acid at 40□. A first polarizer plate was prepared by bonding a triacetyl cellulose film (thickness 80 μm) as a base layer to both surfaces of the first polarizer with an adhesive for a polarizing plate (Z-200, Nippon Goshei Co., Ltd.)

Preparation Example 2: Preparation of Module for Liquid Crystal Display Device

The first polarizing plate of Preparation Example 1, a liquid crystal panel (PVA mode), and each polarizing plate prepared in Examples and Comparative Examples were sequentially assembled to prepare a module for a liquid crystal display device. Each polarizing plate prepared in Examples and Comparative Examples was used as a viewer side polarizing plate, and an antireflection film was disposed at the outermost side in the viewer side.

An LED light source, a light guide plate, and the module for a liquid crystal display device were assembled to prepare a liquid crystal display device including a two-sided edge type LED light source (having same configuration as Samsung LED TV UN55KS800 except for the configurations of modules for liquid crystal display devices prepared in Examples and Comparative Examples). Front luminance was measured in a white mode and a black mode in a spherical coordinate system (0°, 0°) using an EZCONTRAST X88RC (EZXL-176R-F422A4, ELDIM). Relative luminance was calculated as {(luminance in Examples or Comparative Examples)/(luminance in Comparative Example 1)}×100. A target relative luminance is 90% or more.

A side contrast ratio was measured in a spherical coordinate system (0°, 60°) using EZCONTRAST X88RC (EZXL-176R-F422A4, ELDIM). A relative side contrast ratio was calculated as {(side contrast ratio in Examples or Comparative Examples)/(side contrast ratio in Comparative Example 1)}×100. A target side contrast ratio is 110% or more.

TABLE 2

|  | Reflectance at 500 nm (%) | Reflectance at 600 nm (%) | Reflectance slope | Luminous reflectance (%) | Appearance | Relative luminance (%) | Relative side contrast ratio (%) (0°, 60°) |
|---|---|---|---|---|---|---|---|
| Example 1 | 0.794 | 0.725 | 0.069 | 0.76 | 2 | 94 | 143 |
| Example 2 | 1.196 | 1.163 | 0.033 | 1.16 | 3 | 94 | 141 |
| Example 3 | 0.710 | 0.865 | 0.155 | 0.69 | 2 | 95 | 138 |
| Example 4 | 0.651 | 0.573 | 0.078 | 0.61 | 2 | 95 | 140 |
| Example 5 | 0.493 | 0.394 | 0.099 | 0.45 | 1 | 99 | 114 |
| Example 6 | 1.110 | 0.970 | 0.140 | 1.06 | 3 | 95 | 142 |
| Example 7 | 0.760 | 0.740 | 0.020 | 0.79 | 2 | 98 | 118 |
| Example 8 | 1.020 | 0.910 | 0.110 | 0.98 | 3 | 95 | 138 |
| Example 9 | 0.704 | 0.973 | 0.269 | 0.90 | 3 | 96 | 136 |
| Example 10 | 0.770 | 0.730 | 0.040 | 0.73 | 2 | 96 | 134 |
| Comparative Example 1 | 0.529 | 0.466 | 0.063 | 0.48 | 1 | 100 | 100 |
| Comparative Example 2 | 1.683 | 1.574 | 0.109 | 1.64 | 5 | 94 | 140 |
| Comparative Example 3 | 0.836 | 1.547 | 0.711 | 1.38 | 5 | 93 | 138 |
| Comparative Example 4 | 0.772 | 0.711 | 0.061 | 0.67 | 2 | 99 | 105 |
| Comparative Example 5 | 1.479 | 1.368 | 0.091 | 1.44 | 5 | 65 | 174 |
| Comparative Example 6 | 1.184 | 1.115 | 0.069 | 1.13 | 3 | 78 | 156 |

As shown in Table 2, the polarizing plates of Examples had improved black visual sensitivity and appearance even when external light such as sunlight or lighting was irradiated, along with improved visibility and an increased side contrast ratio.

On the other hand, the polarizing plates of Comparative Examples deviating from the scope of the invention had poor appearance, a side contrast ratio, and visibility.

While certain embodiments of the invention have been illustrated and described, it is understood that various modifications, changes, alterations, and equivalent embodiments can be made by those skilled in the art without departing from the spirit and scope of the invention, as defined in the following claims. It should be understood that various modifications, changes, alterations, and equivalent embodiments can be made by those skilled in the art without departing from the spirit and scope of the invention.

The invention claimed is:

1. A polarizing plate comprising a polarizing film, a contrast ratio enhancing layer, and an antireflection film, which are sequentially laminated in this order,
  the antireflection film having minimum reflectance of 0.45% or less,
  the antireflection film comprising a first base layer, a high refractive index layer, and a low refractive index layer, which are sequentially laminated on the contrast ratio enhancing layer in this order,
  the contrast ratio enhancing layer comprises a first resin layer and a second resin layer facing the first resin layer, wherein the second resin layer comprises a patterned portion including optical patterns and a flat portion formed between the optical patterns, the patterned portion satisfying following Equation 1, each optical pattern having a base angle θ of 75° to 90°:

$$1 < P/B \leq 6 \quad \text{[Equation 1]}$$

wherein, P is a pitch of the patterned portion, (unit: μm), and

B is a maximum width of the flat portion, (unit: μm), the polarizing plate having a reflectance slope of 0.3 or less according to following Equation 2:

$$\text{Reflectance slope} = |R_{600} - R_{500}|/|600-500| \times 100 \quad \text{[Equation 2]}$$

wherein, $R_{600}$ is a reflectance value of the polarizing plate at a wavelength of 600 nm, and $R_{500}$ is a reflectance value of the polarizing plate at a wavelength of 500 nm.

2. The polarizing plate of claim 1, wherein the polarizing plate has luminous reflectance of 2% or less.

3. The polarizing plate of claim 1, wherein the polarizing film comprises a polarizer and a protective layer formed on at least one surface of the polarizer, and wherein the protective layer comprises at least one of a protective film and a protective coating layer.

4. The polarizing plate of claim 1, wherein an absolute value of a refractive index difference between the first resin layer and the second resin layer is 0.05 to 0.20.

5. The polarizing plate of claim 1, wherein a refractive index of the second resin layer is higher or lower than a refractive index of the first resin layer.

6. The polarizing plate of claim 1, wherein each optical pattern has an aspect ratio of 0.3 to 3.0.

7. The polarizing plate of claim 1, wherein the first resin layer has a self-adhesive property and the first resin layer is formed directly on the polarizing film.

8. The polarizing plate of claim 1, wherein at least one of an adhesive layer, a bonding layer, and a protective film is further formed between the contrast ratio enhancing layer and the polarizing film.

9. The polarizing plate of claim 1, wherein the high refractive index layer has a refractive index of 1.53 to 1.70.

10. The polarizing plate of claim 1, wherein the first base layer is formed directly on the contrast ratio enhancing layer and wherein the first base layer has an in-plane retardation Re of 60 nm or less at a wavelength of 550 nm.

11. The polarizing plate of claim 1, wherein each optical pattern comprises an engraved pattern, the engraved pattern comprising a first surface at a top part and at least one inclined surface connected to the first surface, the inclined surface comprising a flat or curved optical pattern.

12. The polarizing plate of claim 11, wherein the first surface is flat and the first surface is formed to be parallel to the flat portion.

13. The polarizing plate of claim 1, wherein the high refractive index layer is formed of a composition for the high refractive index layer comprising a high refractive index compound including at least one of a fluorene-based compound and a biphenyl-based compound, a UV curable compound, an initiator, and an inorganic particle.

14. The polarizing plate of claim 13, wherein the inorganic particle comprises zirconia.

15. The polarizing plate of claim 13, wherein the composition for the high refractive index layer further comprises an antistatic agent.

16. The polarizing plate of claim 1, wherein a second base layer is further formed between the contrast ratio enhancing layer and the antireflection film.

17. The polarizing plate of claim 16, wherein an adhesive layer is further formed between the contrast ratio enhancing layer and the antireflection film.

18. The polarizing plate of claim 17, wherein the adhesive layer has a refractive index of 1.40 to 1.65.

19. The polarizing plate of claim 17, wherein the second base layer and the adhesive layer are sequentially formed between the contrast ratio enhancing layer and the antireflection film, the second base layer having an in-plane retardation Re of 8,000 nm or more at a wavelength of 550 nm, the adhesive layer having a refractive index of 1.40 to 1.65.

20. The polarizing plate of claim 19, wherein the first base layer has an in-plane retardation Re of 60 nm or less at a wavelength of 550 nm.

21. A liquid crystal display device comprising a polarizing plate according to claim 1.

* * * * *